(12) United States Patent
Su

(10) Patent No.: US 12,230,275 B2
(45) Date of Patent: Feb. 18, 2025

(54) SPEECH INSTRUCTION RECOGNITION METHOD, ELECTRONIC DEVICE, AND NON-TRANSIENT COMPUTER READABLE STORAGE MEDIUM

(71) Applicant: BOE Technology Group Co., Ltd., Beijing (CN)

(72) Inventor: Shaoxun Su, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/611,436

(22) PCT Filed: Jan. 6, 2021

(86) PCT No.: PCT/CN2021/070516
§ 371 (c)(1),
(2) Date: Nov. 15, 2021

(87) PCT Pub. No.: WO2022/147692
PCT Pub. Date: Jul. 14, 2022

(65) Prior Publication Data
US 2023/0386470 A1 Nov. 30, 2023

(51) Int. Cl.
*G10L 15/02* (2006.01)
*G10L 15/06* (2013.01)
*G10L 15/22* (2006.01)
*G10L 15/26* (2006.01)
*G10L 25/24* (2013.01)

(52) U.S. Cl.
CPC ............ *G10L 15/26* (2013.01); *G10L 15/063* (2013.01); *G10L 25/24* (2013.01)

(58) Field of Classification Search
CPC ....... G10L 15/26; G10L 15/063; G10L 25/24; G10L 15/02; G10L 15/22
See application file for complete search history.

(56) References Cited

U.S. PATENT DOCUMENTS

| 2013/0325446 A1* | 12/2013 | Levien | G10L 15/30 704/E11.001 |
| 2013/0325451 A1* | 12/2013 | Levien | G10L 21/00 704/201 |
| 2019/0005954 A1 | 1/2019 | Xie et al. | |

FOREIGN PATENT DOCUMENTS

| CN | 107134279 A | 9/2017 | |
| CN | 107773982 A | 3/2018 | |
| CN | 108320733 A | 7/2018 | |
| CN | 110675860 A | 1/2020 | |
| CN | 111145728 A * | 5/2020 | ............ G10L 15/02 |

(Continued)

*Primary Examiner* — Jialong He
*Assistant Examiner* — Mulugeta Tuji Dugda
(74) *Attorney, Agent, or Firm* — IPro, PLLC

(57) ABSTRACT

A speech instruction recognition method, an electronic device, and a non-transient computer readable storage medium. The speech instruction recognition method comprises: acquiring a target speech; processing the target speech to obtain a target speech vector corresponding to the target speech; performing speech recognition on the target speech to obtain a target speech text of the target speech, and processing the target speech text to obtain a target text vector corresponding to the target speech text; and inputting the target speech vector and the target text vector to a pre-trained instruction recognition model to obtain an instruction category corresponding to the target speech.

18 Claims, 7 Drawing Sheets

(56) References Cited

FOREIGN PATENT DOCUMENTS

| CN | 111177324 A | * | 5/2020 | ......... G06F 16/3329 |
| WO | WO-2019001458 A1 | * | 1/2019 | ............. G10L 15/26 |
| WO | WO-2020062392 A1 | * | 4/2020 | ........... G06F 15/163 |

* cited by examiner

SPEECH INSTRUCTION RECOGNITION METHOD, ELECTRONIC DEVICE, AND NON-TRANSIENT COMPUTER READABLE STORAGE MEDIUM

TECHNICAL FIELD

The application relates to the technical field of computers, in particular to a speech instruction recognition method, an electronic device, and a non-transient computer readable storage medium.

BACKGROUND

At present, more and more smart devices, such as smart speakers, have emerged with the continuous development of AI technology. When using the smart devices, users send speech instructions to the smart devices, and then, the smart devices give a response according to recognition results.

In related arts, speech instruction recognition is realized by means of spotting keywords. When recognizing a corresponding spotting keyword from a speech instruction from users, the smart device gives a response according to the recognized spotting keyword. However, the spotting keywords may lead to incorrect instruction recognition in some scenarios.

SUMMARY

The disclosure provides a speech instruction recognition method, an electronic device, and a non-transient computer readable storage medium. The technical solution of the disclosure is as follows:

In a first aspect, the disclosure provides a speech instruction recognition method, comprising:

Acquiring a target speech;

Processing the target speech to obtain a target speech vector of the target speech;

Performing speech recognition on the target speech to obtain a target speech text of the target speech, and processing the target speech text to obtain a target text vector corresponding to the target speech text; and Inputting the target speech vector and the target text vector to a pre-trained instruction recognition model to obtain an instruction category corresponding to the target speech.

In a second aspect, the disclosure provides an electronic device, comprising:

A processor; and

A memory for storing an instruction to be executed by the processor.

In a third aspect, the disclosure provides a non-transient computer readable storage medium, wherein when an instruction in the non-transient computer readable storage medium is executed by a processor of an electronic device, the electronic device implements the speech instruction recognition method in the first aspect of the disclosure.

The aforesaid description is merely a brief summary of the technical solution of the invention. To allow those skilled in the art to gain a better understanding of the technical means of the invention so as to implement the invention according to the contents in the specification and to make the above and other purposes, features and advantages of the invention clearer, specific implementations of the invention are given below.

BRIEF DESCRIPTION OF THE DRAWINGS

To more clearly explain the technical solutions of the embodiments of the invention or the prior art, drawings used for describing the embodiments of the invention or the prior art will be briefly introduced below. Obviously, the drawings in the following description only illustrate some embodiments of the invention, and those ordinarily skilled in the art can obtain other drawings according to the following ones without creative labor.

DETAILED DESCRIPTION

To clarify the purposes, technical solutions and advantages of the embodiments of the invention, the technical solutions of the embodiments of the invention will be clearly and completely described below in conjunction with the drawings of the embodiments of the invention. Obviously, the embodiments in the following description are merely illustrative ones, and are not all possible ones of the invention. All other embodiments obtained by those ordinarily skilled in the art based on the following ones without creative labor should also fall within the protection scope of the invention.

Figure 1:
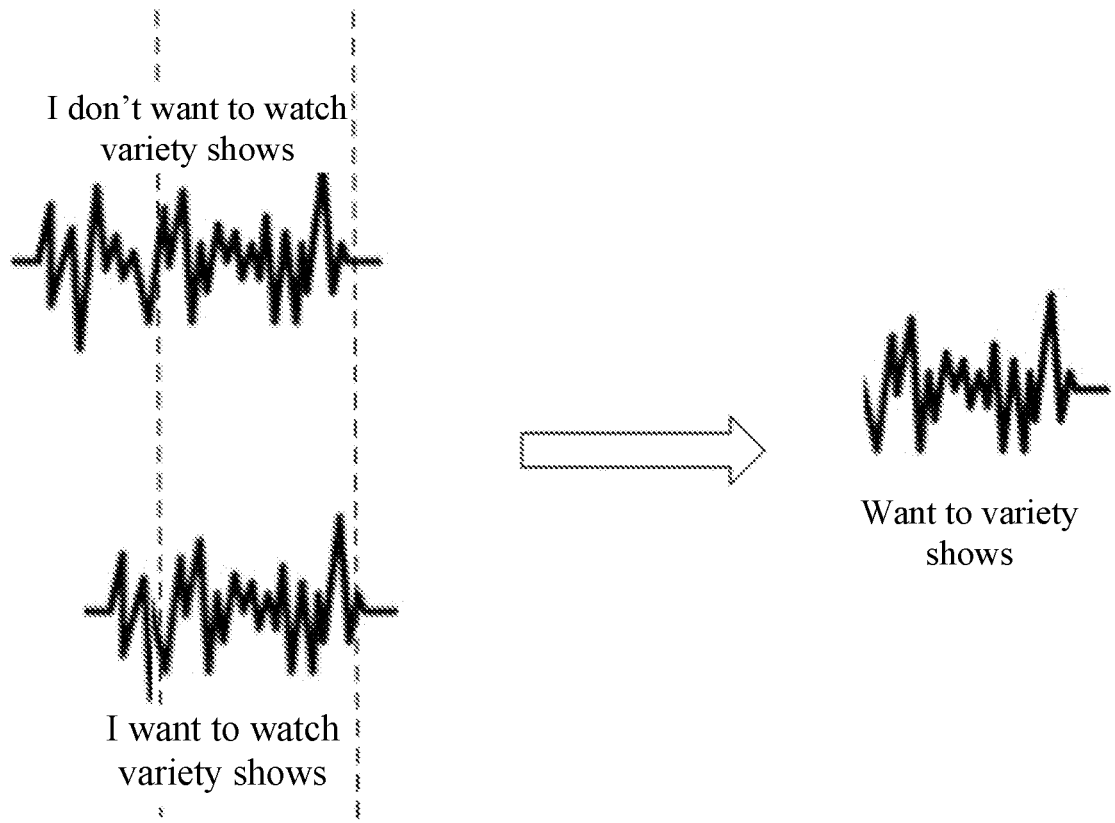
FIG. 1 is a principle diagram of low-accuracy speech recognition in related art.

To ensure the accuracy of instruction recognition, spotting keywords are generally used in related arts to recognize speech instructions. However, the spotting keywords determine the category of instructions according to the similarities between speeches, and may result in incorrect recognition in some scenarios. As shown in FIG. 1, due to a high similarity between the speech "I don't want to watch variety shows" and the speech "I want to watch variety shows", existing speech models may incorrectly recognize the speech "I don't want to watch variety shows" as an opposite example "want to watch variety shows".

Figure 2:
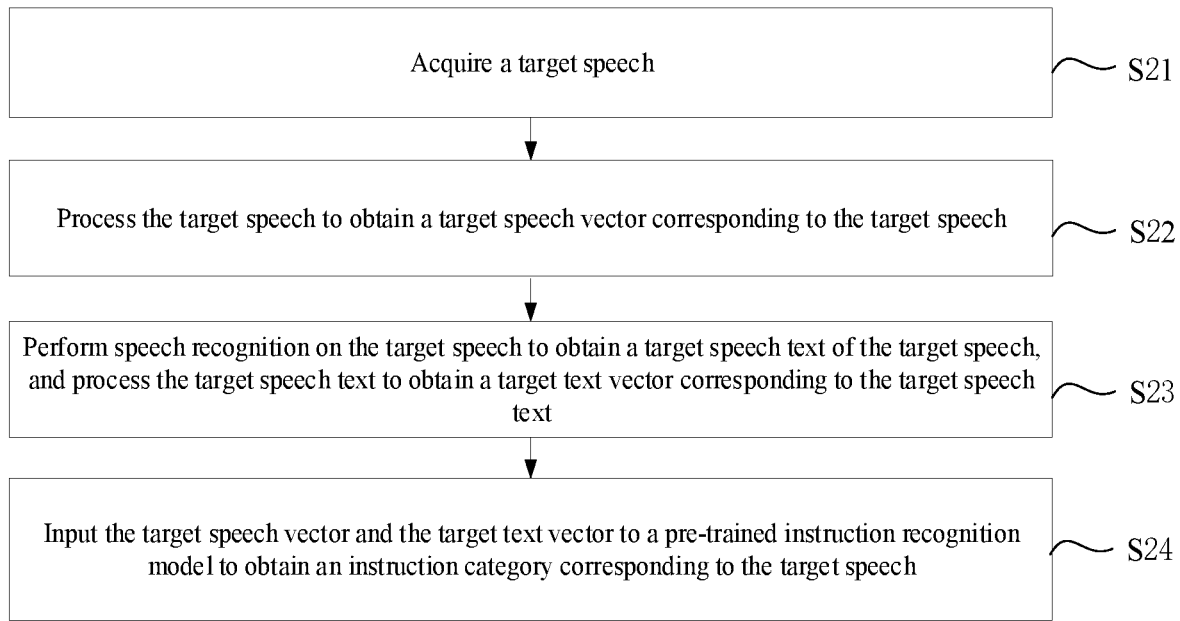
FIG. 2 is a flow diagram of a speech instruction recognition method according to one illustrative embodiment.

To solve the above problem, FIG. 2 illustrates a flow diagram of a speech recognition method according to one illustrative embodiment of the invention. As shown in FIG. 2, the method may comprise the following steps:

S21: acquiring a target speech.

In this embodiment of the disclosure, the target speech may be acquired by microphones on smart devices, and this embodiment of the disclosure has no limitation in this aspect.

Wherein, the smart devices may be smart speakers, smart air conditioners, or the like, and this embodiment of the disclosure has no limitation in this aspect.

The microphones on the smart devices may be one microphone, two microphones, or multiple microphones, and the multiple microphones may constitute different microphone arrays such as linear, circular and L-shaped microphone arrays. This embodiment of the disclosure has no limitation in this aspect.

For example, the target speech may be "I want to watch variety shows", "I don't want to watch variety shows", or the like. This embodiment of the disclosure has no limitation in this aspect.

S22: processing the target speech to obtain a target speech vector corresponding to the target speech.

During specific implementation, the target speech may be transformed into the target speech vector in different ways. For example, in one implementation, the target speech may be transformed into the target speech vector by means of an acoustic model such as GMM-HMM or DNN-HMM. In another implementation, speech features of the target speech are extracted first, and then the speech features of the target speech are processed to obtain the target speech vector with the same dimension as a target text vector. The later implementation will be introduced in detail in the subsequent embodiment.

S23: performing speech recognition on the target speech to obtain a target speech text of the target speech, and processing the target speech text to obtain a target text vector corresponding to the target speech text.

Wherein, ASR (Automatic Speech Recognition) is a technique for acquiring text information capable of being automatically recognized and understood by machines by mode recognition on speech signals that are used as processed objects.

In this embodiment, the ASR technique is used for speech recognition of the target speech to obtain the target speech text. During specific implementation, the target speech text may be transformed into the target text vector in different ways. For example, the target speech text may be transformed into the target text vector by the word embedding technique or by a language model such as a BERT model. The specific implementation of transforming the target speech text into the target text vector will be introduced in detail in the subsequent embodiment.

S24: inputting the target speech vector and the target text vector to a pre-trained instruction recognition model to obtain an instruction category corresponding to the target speech.

During specific implementation, the dimension of the target speech vector may be the same as the dimension of the target text vector. Before being input to the instruction recognition model, the target speech vector and the target text vector may be cut and smoothed to ensure that the target speech vector is as long as the target text vector.

Figure 4:
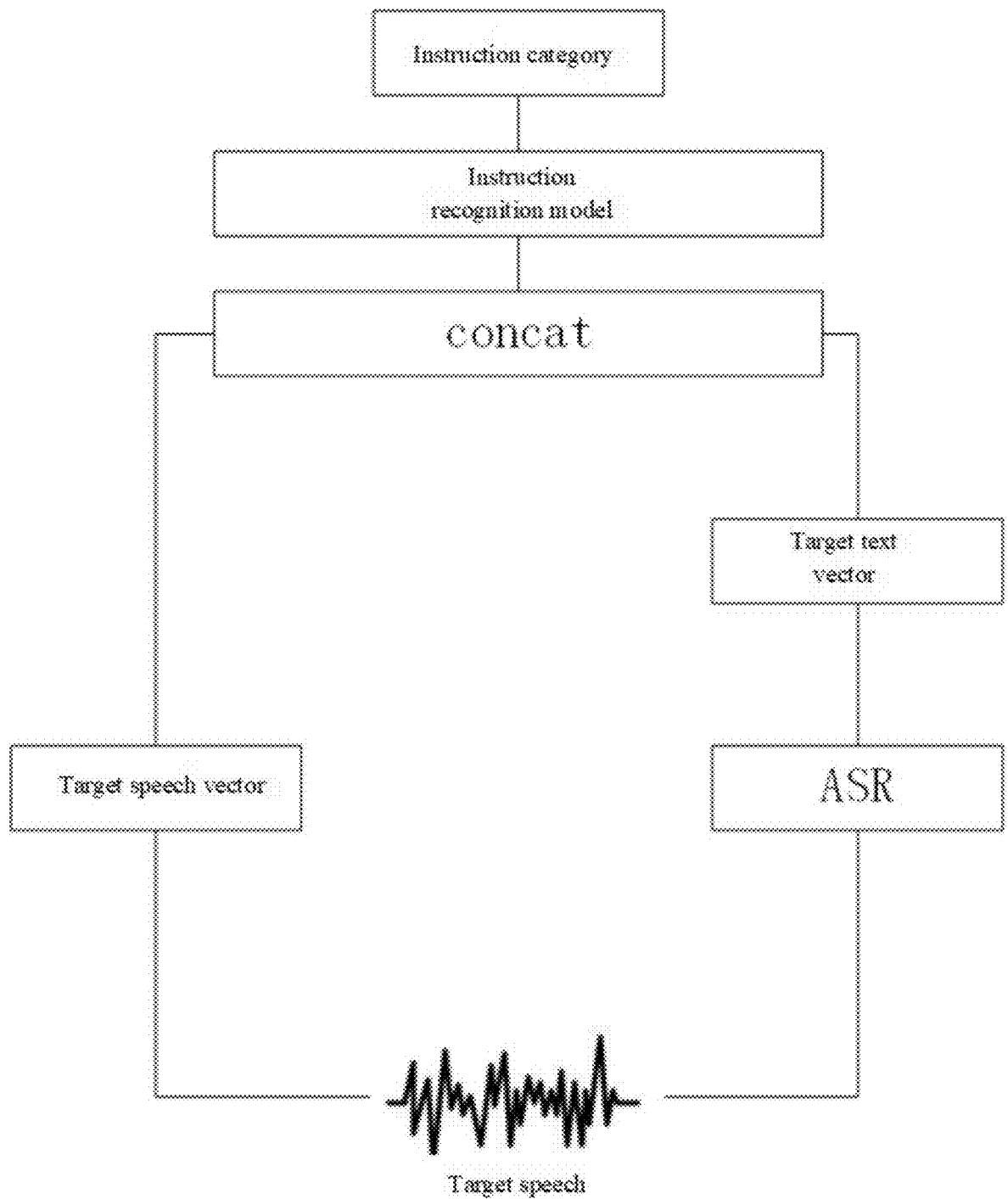
FIG. 4 is a flow diagram of a speech instruction recognition method according to one illustrative embodiment.

In one optional implementation, as shown in FIG. 4, the target speech vector and the target text vector may be subjected to concat to obtain a concat vector; and then, the concat vector is input to the instruction recognition model to obtain the instruction category corresponding to the target speech. 'Concat' refers to an operation commonly used in the field of machine learning to combine two vectors into a longer vector according to certain rules.

Figure 5:
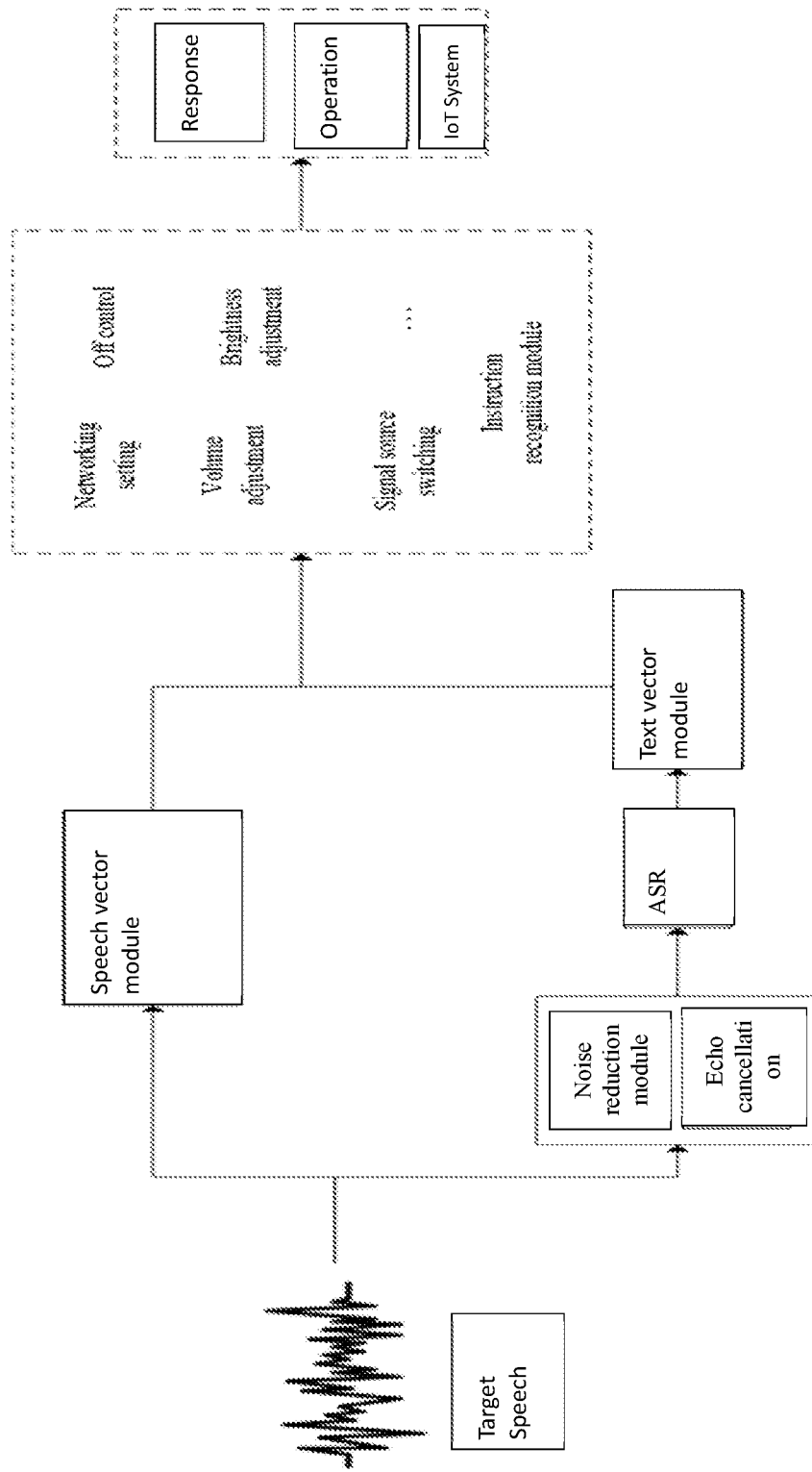
FIG. 5 is a flow diagram of another speech instruction recognition method according to one illustrative embodiment.

Wherein, the instruction category recognized by the instruction recognition model may specifically include networking setting, off control, volume adjustment, brightness adjustment, signal source switching, and the like, as shown in FIG. 5. In actual disclosure, a smart device or an IoT (Internet of Things) system performs a corresponding response or operation according to the recognized instruction category.

In one optional implementation, S24 may specifically comprise:

First, calculating, by the instruction recognition model, the probability of an instruction category i corresponding to the target speech according to the following formula:

$$y^i = \mathrm{softmax}(Wh_t + b),$$

wherein, $y^i$ represents the probability of the instruction category i corresponding to the target speech, i is an integer greater than or equal to 1 and less than or equal to n, n is the total number of instruction categories capable of being recognized by the instruction recognition model, W represents a mapping matrix of the instruction recognition model, $h_t$ represents the concat vector, and b represents a bias matrix of the instruction recognition model;

And, taking an instruction category with a maximum probability in n instruction categories as a target instruction category, wherein the target instruction category is the instruction category corresponding to the target speech.

Wherein, $W \in R^{K \times H}$, K represents the total number of instruction categories, and H represents the length of the concat vector.

During specific implementation, parameters in the mapping matrix W and the bias matrix b may be determined in the training process of the instruction recognition model. The instruction recognition model may be obtained in advance by iterative training with sample speeches. The training process of the instruction recognition model will be introduced in detail in the subsequent embodiment.

According to the speech instruction recognition method provided by this embodiment, both original speech information of the target speech and text information obtained by speech recognition are used for instruction recognition of the target speech, wherein the original speech information guarantees the accuracy of instruction recognition; and incorrect recognition results of speech information may be amended according to the text information, such that opposite examples may be figured out accurately, and instructions with similar speeches and opposite meanings may be recognized accurately. Compared with a method merely depending on speech information or text information, the solution of the invention improves the accuracy of speech instruction recognition, reduces the misoperation rate, and improves the usage experience of users. By adoption of the technical solution of the disclosure, the problem that the recognition accuracy on similar speeches of devices with a speech control capacity such as televisions and smart speakers is low is solved.

In one optional implementation, S22 may specifically comprise the following steps: performing feature extraction on the target speech to obtain a target speech feature of the target speech; and then, inputting the target speech feature to a pre-trained speech vector model to obtain a target speech vector.

In this embodiment of the disclosure, the target speech feature may be at least one of acoustic features such as Mel Frequency Cepstral Coefficient (MFCC) features, Linear Prediction Cepstrum Coefficient (LPCC) features and Fbank features.

Wherein, MFCC is a coefficient constituting a Mel frequency cepstrum which is derived from a cepstrum of an audio clip. The difference between the cepstrum and the Mel frequency cepstrum lies in that the frequency band of the Mel frequency cepstrum is equally divided by Mel scale and is closer to the auditory system of humans than the linearly divided frequency band of a common logarithmic cepstrum. Such nonlinear representation enables acoustic signals to be better represented in many fields. Thus, features that are more accurate to auditory features of human ears may be obtained by extracting MFCC feature data from the target speech, and the robustness is higher.

Feature extraction performed on the target speech may include the steps of pre-emphasizing, framing, windowing, FFT, processing by a Mel filter bank, logarithm operation, and DCT. Wherein, pre-emphasizing is performed to the high-frequency part to make the frequency spectrum of signals smooth and be kept in the whole frequency band from low frequency to high frequency, such that the frequency spectrum may be resolved with the same signal to noise ratio. Framing is performed to divide the target speech into small fragments. Windowing is performed to assign the small fragments with window function weights to improve the continuity of the left and right ends of frames. FFT is performed to obtain energy distribution of the frequency spectrum. The Mel filter bank is used for smoothing the frequency spectrum and eliminating harmonic waves to highlight the resonance peak of the original target speech to reduce the calculation amount. Finally, the steps of logarithm operation, DCT, and dynamic differential parameter extraction are performed on obtained energy, such that the MFCC feature is obtained.

In this embodiment of the disclosure, the speech vector model may be obtained in advance by iterative training with sample speeches. The training process of the speech vector model will be introduced in detail in the subsequent embodiment.

During specific implementation, the target speech feature of the target speech such as the MFCC feature (2D feature matrix) is extracted first to transform the target speech from a time domain to a feature domain; and then, the target speech feature is input to the speech vector model to output the target speech vector.

In one optional implementation, S23 may specifically comprise the following steps: inputting the target speech text to a pre-trained text vector model to obtain a target text vector.

In this embodiment of the disclosure, the text vector model may be obtained in advance by iterative training with sample speeches. The training process of the text vector model will be introduced in detail in the subsequent embodiment.

During specific implementation, noise reduction and echo cancellation may be performed on the target speech first, then the processed target speech is transformed into the target speech text by the ASR technique, and then, the target speech text is input to the text vector model to output the target text vector.

In this implementation, the speech instruction recognition method incorporating text information is provided. Referring to FIG. 5, the target speech vector of the target speech is acquired by means of the speech vector model, the target speech is transformed into the target speech text by the ASR technique, the target text vector is obtained according to text information in the target speech text, then the target speech vector and the target text vector are input to the instruction recognition model, and finally, the instruction category corresponding to the target speech is obtained.

In one optional implementation, joint training may be performed on a first to-be-trained model, a second to-be-trained model and a third to-be-trained model to obtain the speech vector model, the text vector model and the instruction recognition model.

Figure 3:
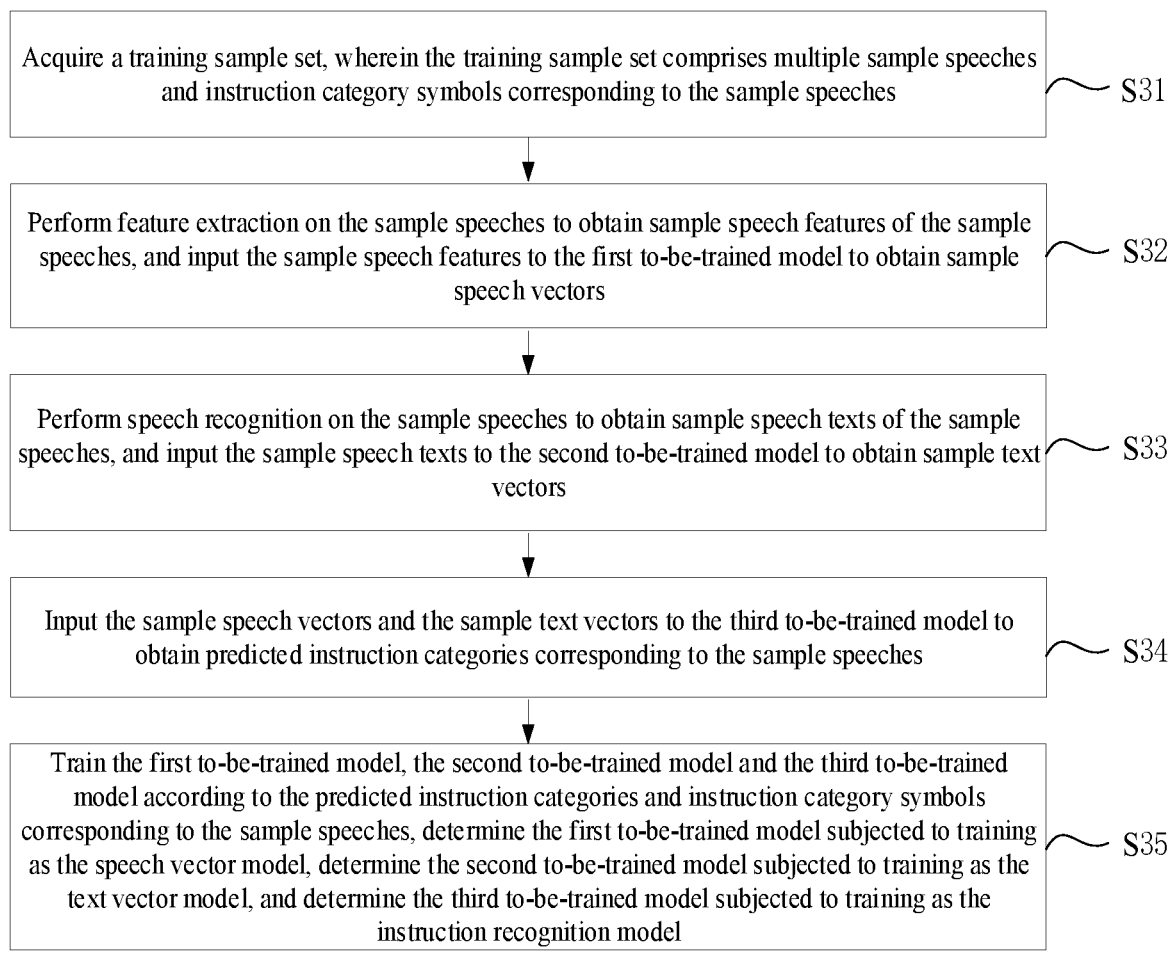
FIG. 3 is a flow diagram of a model training process according to one illustrative embodiment.

In one optional implementation, as shown in FIG. 3, the step of performing joint training on the first to-be-trained model, the second to-be-trained model and the third to-be-trained model may specifically comprise:

S31: acquiring a training sample set, wherein the training sample set comprises multiple sample speeches and instruction category symbols corresponding to the sample speeches.

Wherein, the multiple sample speeches may comprise sample speeches corresponding to different instruction categories.

S32: performing feature extraction on the sample speeches to obtain sample speech features of the sample speeches, and inputting the sample speech features to the first to-be-trained model to obtain sample speech vectors.

Wherein, the first to-be-trained model may be a neural network model such as a convolutional network model or a fully connected network mode.

According to the fully connected network model, each node of fully connected layers (FC) is connected to all nodes of the previous layer to integrate speech features extracted before; and the fully connected network model is used for weighted summation of the speech features designed before to map a speech feature matrix to a vector space with the same dimension as the sample text vector.

During specific implementation, sample speech features of the sample speeches such as MFCC features (2D feature matrixes) may be extracted first to transform the sample speeches from a time domain to a feature domain; and then, the sample speech features are input to the first to-be-trained model to output sample speech vectors.

S33: performing speech recognition on the sample speeches to obtain sample speech texts of the sample speeches, and inputting the sample speech texts to the second to-be-trained model to obtain sample text vectors.

Wherein, the second to-be-trained model may be a neutral network model such as a recurrent neural network model (such as LSTM) and a convolutional network model, or a pre-trained language model such as a wordembedding model or a BERT model.

Because the BERT model is a true bidirectional language model allow the context information of each word to be used, more accurate text vectors may be obtained when the BERT model is used as the second to-be-trained model, thus further improving the recognition accuracy.

Because the text vector model is obtained by training by means of an external knowledge base, a text training set or a pre-trained language model and possesses semantically relevant knowledge not included in speech information, the text vector model may be used to recognize semantic information of speech texts to realize recognize colloquial speech instructions and amend incorrect recognition results of speech information, such that opposite examples are avoided, and instructions with similar speeches and opposite meanings may also be accurately recognized, thus improving the accuracy of speech instruction recognition and reducing the misoperation rate.

Considering that there are a few speech datasets that can be selected by developers in a large quantity of text data on the Internet, the external knowledge base, the text training set or the pre-trained language model is introduced to cover language expressions in different scenarios with a large number of texts, and text information is introduced for semantic recognition on the basis of limited speech information, such that the accuracy of instruction recognition is further improved.

During specific implementation, the sample speeches are transformed into sample speech texts by the AST technique, and then the sample speech texts are input to the second to-be-trained model to output sample text vectors.

S34: inputting the sample speech vectors and the sample text vectors to the third to-be-trained model to obtain predicted instruction categories corresponding to the sample speeches.

During specific implementation, concat may be performed on the sample speech vectors and the sample text vectors to obtain concat vectors; and then the concat vectors are input to the third to-be-trained model to obtain predicted instruction categories corresponding to the sample speeches.

Wherein, the third to-be-trained model may be a softmax logistic regression model.

S35: training the first to-be-trained model, the second to-be-trained model and the third to-be-trained model according to the predicted instruction categories and instruction category symbols corresponding to the sample speeches, determining the first to-be-trained model subjected to training as the speech vector model, determining the second to-be-trained model subjected to training as the text vector model, and determining the third to-be-trained model subjected to training as the instruction recognition model.

In one optional implementation, a loss function may be calculated first according to the predicted instruction categories and instruction category symbols corresponding to the sample speeches; and then, the first to-be-trained model, the second to-be-trained model and the third to-be-trained model are trained with the aim of minimizing the loss function, wherein the loss function is a cross-entropy loss function.

Specifically, the loss function using the cross-entropy loss function for joint training may be expressed as:

$$\text{loss} = -\Sigma_{K=1}^{K} t_k \log y_k,$$

wherein K represents the total number of instruction categories, $t_k$ represents the category symbols, and $y_k$ represent the predicted instruction categories.

According to the technical solution of the disclosure, both speech information and text information represented by speeches are used for recognition of speech instructions, and key features are extracted by means of semantic information, such that the accuracy of instruction recognition is guaranteed; and the extensive knowledge of language models is introduced by means of text information to amend incorrect recognition results of speech information, such that opposite examples may be figured out accurately, and instructions with similar speeches and opposite meanings may be recognized accurately. Compared with a method merely depending on speech information or text information, the remote control technique incorporating text information improves the accuracy of speech instruction recognition, reduces the misoperation rate, and improves the usage experience of users.

Figure 6:
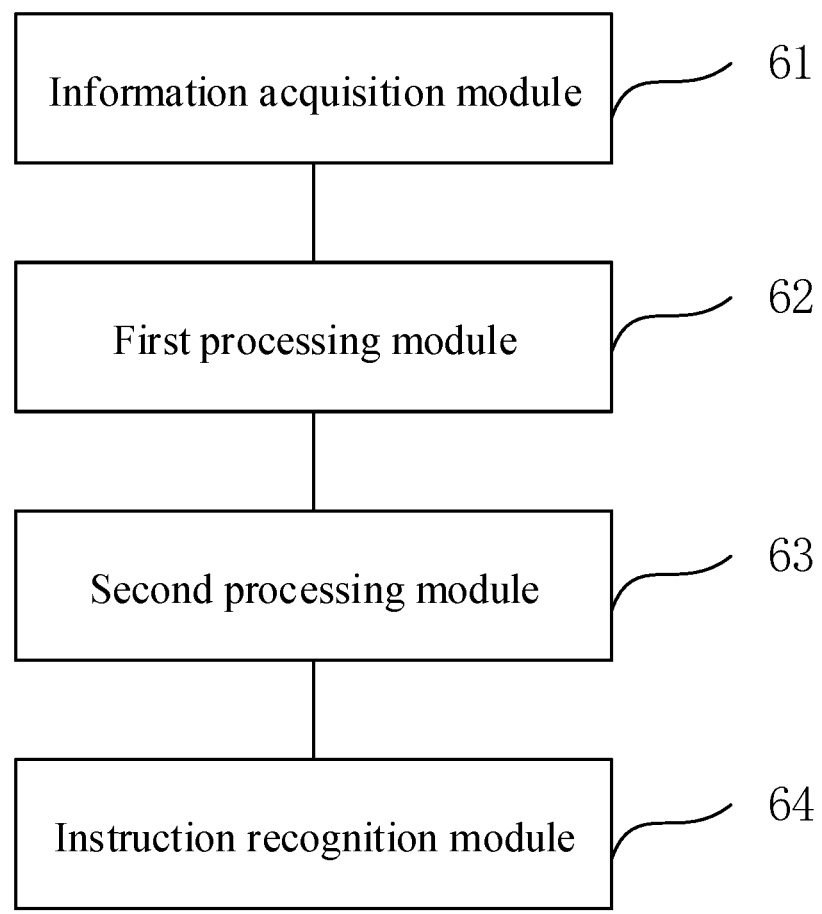
FIG. 6 is a structural block diagram of a speech instruction recognition apparatus according to one illustrative embodiment.

FIG. 6 is a block diagram of a speech instruction recognition apparatus according to one illustrative embodiment. Referring to FIG. 6, the speech instruction recognition apparatus may comprise:

An information acquisition module 61 configured to acquire a target speech;

A first processing module 62 configured to process the target speech to obtain a target speech vector corresponding to the target speech;

A second processing module 63 configured to perform speech recognition on the target speech to obtain a target speech text of the target speech, and process the target speech text to obtain a target text vector corresponding to the target speech text; and An instruction recognition module 64 configured to input the target speech vector and the target text vector to a pre-trained instruction recognition model to obtain an instruction category corresponding to the target speech.

In this embodiment of the disclosure, the information acquisition module 61 may acquire the target speech by means of microphones on smart devices, and this embodiment of the disclosure has no limitation in this aspect.

Wherein, the smart devices may be smart speakers, smart air conditioners, or the like, and this embodiment of the disclosure has no limitation in this aspect.

The microphones on the smart devices may be one microphone, two microphones, or multiple microphones, and the multiple microphones may constitute different microphone arrays such as linear, circular and L-shaped microphone arrays. This embodiment of the disclosure has no limitation in this aspect.

For example, the target speech may be "I want to watch variety shows", "I don't want to watch variety shows", or the like. This embodiment of the disclosure has no limitation in this aspect.

During specific implementation, the second processing module 62 may transform the target speech into the target speech vector in different ways. For example, in one implementation, the second processing module 62 transforms the target speech into the target speech vector by means of an acoustic model such as GMM-HMM or DNN-HMM. In another implementation, the second processing module 62 extracts speech features of the target speech first, and then processes the speech features of the target speech to obtain the target speech vector with the same dimension as a target text vector. The later implementation will be introduced in detail in the subsequent embodiment.

Wherein, Automatic Speech Recognition (ASR) is a technique for acquiring text information capable of being automatically recognized and understood by machines by mode recognition on speech signals that are used as processed objects.

In this embodiment, the second processing module 63 performs speech recognition on the target speech by means of the ASR technique to obtain the target speech text. During specific implementation, the second processing module 63 may transform the target speech text into the target text vector in different ways. For example, the second processing module 63 transforms the target speech text into the target text vector by means of the word embedding technique or by means of a language model such as a BERT model. The specific implementation of transforming the target speech text into the target text vector will be introduced in detail in the subsequent embodiment.

During specific implementation, the dimension of the target speech vector may be the same as the dimension of the target text vector. Before the target speech vector and the target text vector are input to the instruction recognition model, the instruction recognition module 64 may cut and smooth the target speech vector and the target text vector to ensure that the target speech vector is as long as the target text vector.

In one optional implementation, as shown in FIG. 4, the instruction recognition module 64 may perform concat on the target speech vector and the target text vector to obtain a concat vector, and input the concat vector to the instruction recognition model to obtain the instruction category corresponding to the target speech.

Wherein, the instruction category recognized by the instruction recognition model may specifically include networking setting, off control, volume adjustment, brightness adjustment, signal source switching, and the like, as shown in FIG. 5. In actual disclosure, a smart device or an IoT (Internet of Things) system performs a corresponding response or operation according to the recognized instruction category.

In one optional implementation, the instruction recognition module 64 is specifically configured to:

Calculate, by means of the instruction recognition model, the probability of an instruction category i corresponding to the target speech according to the following formula:

$$y^i = \text{softmax}(Wh_I + b),$$

wherein, $y^i$ represents the probability of the instruction category i corresponding to the target speech, i is an integer greater than or equal to 1 and less than or equal to n, n is the total number of instruction categories capable of being recognized by the instruction recognition model, W represents a mapping matrix of the instruction recognition model, $h_I$ represents the concat vector, and b represents a bias matrix of the instruction recognition model;

Take an instruction category with a maximum probability in n instruction categories as a target instruction category, wherein the target instruction category is the instruction category corresponding to the target speech.

Wherein, $W \in R^{K \times H}$, K represents the total number of instruction categories, and H represents the length of the concat vector.

During specific implementation, parameters in the mapping matrix W and the bias matrix b may be determined in the training process of the instruction recognition model. The instruction recognition model may be obtained in advance by iterative training with sample speeches. The training process of the instruction recognition model will be introduced in detail in the subsequent embodiment.

According to the speech instruction recognition apparatus provided by this embodiment, both original speech information of the target speech and text information obtained by speech recognition are used for instruction recognition of the target speech, wherein the original speech information guarantees the accuracy of instruction recognition; and incorrect recognition results of speech information may be amended according to the text information, such that opposite examples may be figured out accurately, and instructions with similar speeches and opposite meanings may be recognized accurately. Compared with a method merely depending on speech information or text information, the solution of the invention improves the accuracy of speech instruction recognition, reduces the misoperation rate, and improves the usage experience of users. By adoption of the technical solution of the disclosure, the problem that the recognition accuracy on similar speeches of devices with a speech control capacity such as televisions and smart speakers is low is solved.

In one optional implementation, the instruction recognition module 64 is specifically configured to:

Perform concat on the target speech vector and the target text vector to obtain a concat vector; and Input the concat vector to the instruction recognition model to obtain the instruction category corresponding to the target speech.

In one optional implementation, the instruction recognition module 64 is specifically configured to:

Calculate, by means of the instruction recognition model, the probability of an instruction category i corresponding to the target speech according to the following formula;

$$y^i = \text{softmax}(Wh_I + b),$$

wherein, $y^i$ represents the probability of the instruction category i corresponding to the target speech, i is an integer greater than or equal to 1 and less than or equal to n, n is the total number of instruction categories capable of being recognized by the instruction recognition model, W represents a mapping matrix of the instruction recognition model, $h_I$ represents the concat vector, and b represents a bias matrix of the instruction recognition model;

Take an instruction category with a maximum probability in n instruction categories as a target instruction category, wherein the target instruction category is the instruction category corresponding to the target speech.

In one optional implementation, the first processing module 62 is specifically configured to:

Perform feature extraction on the target speech to obtain a target speech feature of the target speech; and Input the target speech feature to a pre-trained speech vector model to obtain the target speech vector.

In one optional implementation, the target speech feature is an MFCC feature.

In one optional implementation, the second processing module 63 is specifically configured to:

Input the target speech text to a pre-trained text vector model to obtain the target text vector.

In one optional implementation, the apparatus further comprises:

A model training module configured to perform joint training on a first to-be-trained model, a second to-be-trained model and a third to-be-trained model to obtain the speech vector model, the text vector model and the instruction recognition model.

In one optional implementation, the model training module is specifically configured to:

Acquire a training sample set, wherein the training sample set comprises multiple sample speeches and instruction category symbols corresponding to the sample speeches;

Perform feature extraction on the sample speeches to obtain sample speech features of the sample speeches, and input the sample speech feature to the first to-be-trained model to obtain sample speech vectors;

Perform speech recognition on the sample speeches to obtain sample speech texts of the sample speeches, and input the sample speech texts to the second to-be-trained model to obtain sample text vectors;

Input the sample speech vectors and the sample text vectors to the third to-be-trained model to obtain predicted instruction categories corresponding to the sample speeches; and Train the first to-be-trained model, the second to-be-trained model and the third to-be-trained model according to the predicted instruction categories and instruction category symbols corresponding to the sample speeches, determine the first to-be-trained model subjected to training as the speech vector model, determine the second to-be-trained model subjected to training as the text vector model, and determine the third to-be-trained model subjected to training as the instruction recognition model.

In one optional implementation, the model training module is specifically configured to:

Calculate a loss function according to the predicted instruction categories and instruction categories corresponding to the sample speeches; and Train the first to-be-trained model, the second to-be-trained model and the third to-be-trained model with the aim of minimizing the loss function, wherein the loss function is a cross-entropy loss function.

In one optional implementation, the first to-be-trained model is a convolutional network model or a fully connected network model.

In one optional implementation, the second to-be-trained model is a recurrent neural network model, a convolutional network model, or a BERT model.

In one optional implementation, the third to-be-trained model is a softmax logistic regression model.

The specific operations performed by the modules of the apparatus in this embodiment have been described in detail in the embodiments of the method, and will no longer be detailed here.

Figure 7:
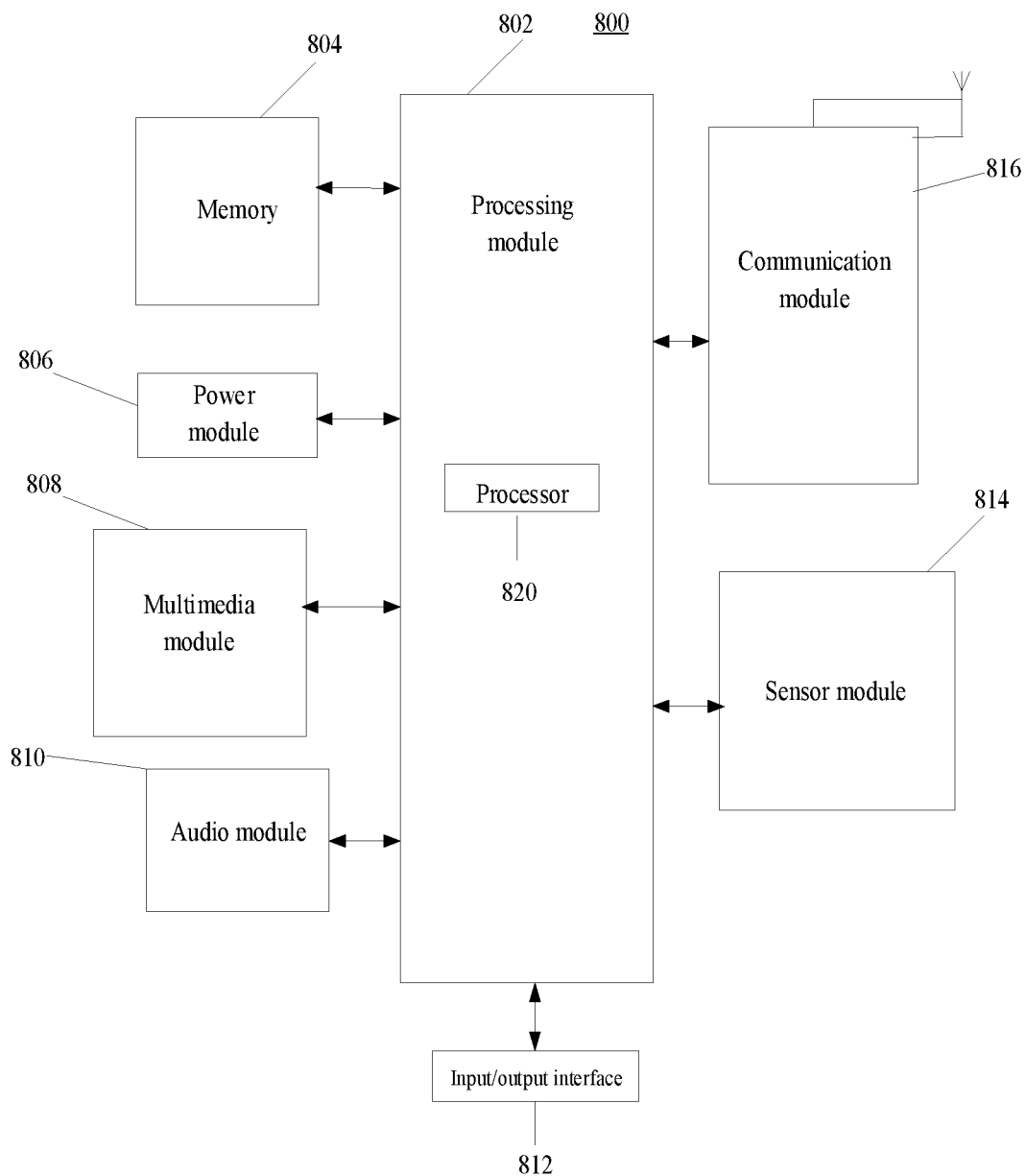
FIG. 7 is a block diagram of an electronic device according to one illustrative embodiment.

FIG. 7 illustrates a block diagram of an electronic device 800 of the disclosure. For example, the electronic device 800 may be a mobile phone, a computer, a digital broadcasting terminal, an information receiving and sending device, a game console, a tablet device, a medical device, a fitness device, a personal digital assistant, or the like.

Referring to FIG. 7, the electronic device 800 may comprise one or more of the following modules: a processing module 802, a memory 804, a power module 806, a multimedia module 808, an audio module 810, an input/output (I/O) interface 812, a sensor module 814, and a communication module 816.

The processing module 802 generally controls all operations of the electronic device 800, such as operations relating to display, phone calls, data communication, camera operation and recording, and may comprise one or more processors 820 for implementing instructions to complete all or part of the steps of the speech instruction recognition method in any one embodiment. In addition, the processing module 802 may comprise one or more units for realizing interaction between the processing module 802 and other modules. For example, the processing module 802 may comprise a multimedia unit for realizing the interaction between the multimedia module 808 and the processing module 802.

The memory 804 is configured to store different types of data to support operations on the electronic device 800. For example, the data includes instructions of any APPs or methods to be operated on the electronic device 800, contact data, telephone directory data, messages, pictures, videos, and the like. The memory 804 may be any volatile or nonvolatile memory devices or combinations thereof, such as SRAM, EPROM, PROM, ROM, magnetic memories, flash memories, magnetic disks, or CDs.

The power module 806 supplies power to other modules of the electronic device 800, and may comprise a power management system, one or more power sources, and other modules relating to power generation, management and distribution of the electronic device 800.

The multimedia module 808 comprises a screen for providing an output interface between the electronic device 800 and users. In some embodiment, the screen may comprise a liquid crystal display (LCD) and a touch panel (TP). If the screen comprises the touch panel, the screen may be a touch screen for receiving input signals from the users. The touch panel comprises one or more touch sensors for sensing touch or sliding motions and gestures on the touch panel. The touch sensor is not only able to sense the boundary of the touch or sliding motions, but also able to detect the duration and pressure of the touch or sliding motions. In some embodiments, the multimedia module 808 further comprises a front camera and/or a rear camera. When the electronic device 800 is in an operation mode such as a photographing mode or a video mode, the front camera and/or the rear camera is able to receive multimedia data from the outside. Each front camera or rear camera may be a fixed optional lens system or may have a focal length and an optical zooming capacity.

The audio module 810 is configured to output and/or input audio signals. For example, the audio module 810 comprises a microphone (MIC). When the electronic device 800 is in an operation mode such as a calling mode, a recording mode or a speech recognition mode, the microphone is configured to receive external audio signals. The received audio signals are then stored in the memory 804 or sent by the communication module 816. In some embodiments, the audio module 810 further comprises a speaker for outputting audio signals.

The I/O interface 812 provides an interface between the processing module 802 and a peripheral interface module, and the peripheral interface module may be a keyboard, a click wheel, or a key. The key may be, but is not limited to, a homepage key, a volume key, a start key, or a lock key.

The sensor module 814 comprises one or more sensors, and is used for providing state evaluations in different aspects for the electronic device 800. For example, the sensor module 814 is able to detect the on/off state of the electronic device 800, and relative positioning of modules such as a display and a small keyboard of the electronic device 800. The sensor module 814 is also able to detect position changes of the electronic device 800 or one module of the electronic device 800, whether the electronic device 800 is touched by users, the direction or acceleration/deceleration of the electronic device 800, and temperature changes of the electronic device 800. The sensor module 814 may comprise a proximity sensor configured to detect the existence of objects nearby in case of no any physical contact. The sensor module 814 may further comprise a photo sensor, such as a CMOS or CCD image sensor, used for imaging. In some embodiments, the sensor module 814 may further comprise an acceleration sensor, a gyro sensor, a magnetic sensor, a pressure sensor or a temperature sensor.

The communication module 816 is configured to realize wired or wireless communication between the electronic device 800 and other devices. The electronic device 800 may be accessed to a wireless network based on communication standards, such as WiFi, service provider's networks (such as 2G, 3G, 4G or 5G), or combinations thereof. In one illustrative embodiment, the communication module 816 receives broadcasting signals or relevant information from an external broadcasting management system by means of a broadcasting channel. In one illustrative embodiment, the communication module 816 further comprises a near field communication (NFC) module to promote short-range communication. For example, the NFC module may be realized based on the RFID technique, the IrDA technique, the UWB technique, the BT technique and other techniques.

In an illustrative embodiment, the electronic device 800 may be realized by one or more ASICS, DSPs, DSPDs, PLDs, FPGAs, controllers, microcontrollers, microprocessors, or other electronic elements, to be used to implement the speech instruction recognition method in any one embodiment.

In an illustrative embodiment, a non-transient computer readable storage medium comprising an instruction, such as a memory 804 comprising an instruction, is further provided. The instruction may be executed by a processor 820 of an electronic device 800 to implement the speech instruction recognition method in any one embodiment. For example, the non-transient computer readable storage medium may be an ROM, an RAM, a CD-ROM, a magnetic disk, a floppy disk, an optical data storage device, and the like.

In an illustrative embodiment, a computer program product is further provided. The computer program product comprises readable program codes, which are executed by a processor 820 of an electronic device 800 to implement the speech instruction recognition method in any one embodiment. Optionally, the program codes may be stored in a storage medium of the electronic device 800. The storage medium may be a non-transient computer readable storage medium such as an ROM, an RAM, a CD-ROM, a magnetic disk, a floppy disk and an optical data storage device.

Figure 8:
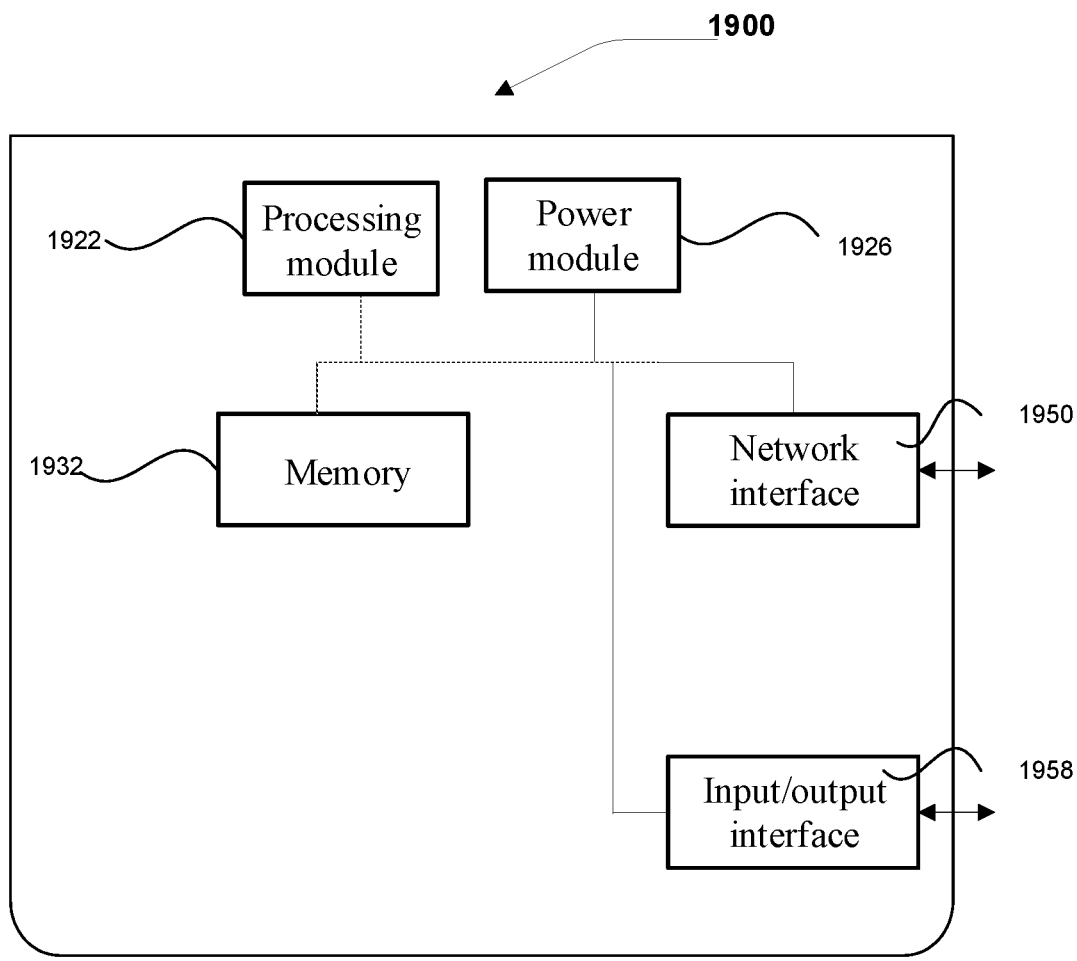
FIG. 8 is a block diagram of another electronic device according to one illustrative embodiment.

FIG. 8 is a block diagram of an electronic device 1900 of the disclosure. For example, the electronic device 1900 may be provided as a server.

Referring to FIG. 8, the electronic device 1900 comprises a processing module 1922, which further comprises one or more processors, a memory source represented by a memory 1932 and used for storing instructions to be executed by the processing module 1922, such as an APP. The APP stored in the memory 1932 may comprise one or more modules each corresponding to one set of instructions. In addition, the processing module 1922 is configured to execute the instructions to implement the speech instruction recognition method in any one embodiment.

The electronic device may further comprise a power module 1926 configured to perform power management of the electronic device, a wired or wireless network interface 1950 configured to connect the electronic device 1900 to a network, and an input/output (I/O) interface 1958. The electronic device 1900 may operate an operating system stored in the memory 1932, such as WindowsServer™, MacOSX™, Unix™, Linux™ or FreeBSD™.

"One embodiment", "an embodiment" or "one or more embodiments" in this specification means that specific features, structures, or characteristics described in conjunction with said embodiment are included in at least one embodiment of the disclosure. In addition, it should be noted that the expression "in one embodiment" does not definitely refer to the same embodiment.

A great plenty of specific details are provided in this specification. However, it can be understood that the embodiments of the disclosure can be implemented even without these specific details. In some embodiments, known methods, structures and techniques are not stated in detail to ensure that the understanding of this specification will not be obscured.

In the claims, any reference marks should not be construed as limitations of the claims. The term "comprise" shall not exclude the existence of elements or steps not listed in the claims. "A/an" or "one" before an element shall not exclude the possibility of multiple said elements. The invention may be implemented by means of hardware comprising a plurality of different elements and a properly programmed computer. In a claim in which a plurality of devices are listed, several of these devices may be specifically implemented by means of the same hardware. Terms such as "first", "second" and "third" do not indicate any order, and may be interpreted as names.

Finally, it should be noted that the above embodiments are merely used to explain the technical solutions of the invention, and are not intended to limit the invention. Although the invention has been explained in detail with reference to the above embodiments, those ordinarily skilled in the art would appreciate that the technical solutions recorded in these embodiments can still be amended or part of the technical features in these embodiments can be equivalently substituted without causing the essence of corresponding technical solutions to deviate from the spirit and scope of the technical solutions of these embodiments.

The invention claimed is:

1. A speech instruction recognition method, comprising:
acquiring a target speech;
processing the target speech to obtain a target speech vector corresponding to the target speech;
performing speech recognition on the target speech to obtain a target speech text of the target speech, and processing the target speech text to obtain a target text vector corresponding to the target speech text;
generating a to-be-trained instruction recognition model;
obtaining a pre-trained instruction recognition model by performing an iterative training on the to-be-trained instruction recognition model with sample speeches;
inputting the target speech vector and the target text vector to the pre-trained instruction recognition model to obtain an instruction category corresponding to the target speech, so that a corresponding operation is performed according to the obtained instruction category,
wherein the step of inputting the target speech vector and the target text vector to the pre-trained instruction recognition model to obtain an instruction category corresponding to the target speech comprises:
performing concat on the target speech vector and the target text vector to obtain a concat vector; and
inputting the concat vector to the pre-trained instruction recognition model to obtain the instruction category corresponding to the target speech;
performing a response or operation using a smart device or an IoT (Internet of Things) system according to the instruction category.

2. The speech instruction recognition method according to claim 1, wherein the step of inputting the concat vector to the pre-trained instruction recognition model to obtain the instruction category corresponding to the target speech comprises:
calculating, by the pre-trained instruction recognition model, a probability of an instruction category i corresponding to the target speech;

$$y^i = \mathrm{softmax}(Wh_I + b),$$

wherein, $y^i$ represents the probability of the instruction category i corresponding to the target speech, i is an integer greater than or equal to 1 and less than or equal to n, n is the total number of instruction categories capable of being recognized by the instruction recognition model, W represents a mapping matrix of the instruction recognition model, $h_I$ represents the concat vector, and b represents a bias matrix of the instruction recognition model;
taking an instruction category with a maximum probability in n instruction categories as a target instruction category, wherein the target instruction category is the instruction category corresponding to the target speech.

3. The speech instruction recognition method according to claim 1, wherein the step of processing the target speech to obtain a target speech vector corresponding to the target speech comprises:

performing feature extraction on the target speech to obtain a target speech feature of the target speech; and inputting the target speech feature to a pre-trained speech vector model to obtain the target speech vector.

4. The speech instruction recognition method according to claim 3, wherein the target speech feature is a Mel Frequency Cepstral Coefficient feature.

5. The speech instruction recognition method according to claim 3, wherein the step of processing the target speech text to obtain a target text vector corresponding to the target speech text comprises:

inputting the target speech text to a pre-trained text vector model to obtain the target text vector.

6. The speech instruction recognition method according to claim 5, wherein before the step of inputting the target speech feature to a pre-trained speech vector model, the step of inputting the target speech text to a pre-trained text vector model and the step of inputting the target speech vector and the target text vector to the pre-trained instruction recognition model, the method further comprises:

performing joint training on a first to-be-trained model, a second to-be-trained model and the to-be-trained instruction recognition model to obtain the speech vector model, the text vector model and the pre-trained instruction recognition model.

7. The speech instruction recognition method according to claim 6, wherein the step of performing joint training on a first to-be-trained model, a second to-be-trained model and the to-be-trained instruction recognition model to obtain the speech vector model, the text vector model and the pre-trained instruction recognition model comprises:

acquiring a training sample set, wherein the training sample set comprises multiple sample speeches and instruction category symbols corresponding to the sample speeches;

performing feature extraction on the sample speeches to obtain sample speech features of the sample speeches, and inputting the sample speech features to the first to-be-trained model to obtain sample speech vectors;

performing speech recognition on the sample speeches to obtain sample speech texts of the sample speeches, and inputting the sample speech texts to the second to-be-trained model to obtain sample text vectors;

inputting the sample speech vectors and the sample text vectors to the to-be-trained instruction recognition model to obtain predicted instruction categories corresponding to the sample speeches; and training the first to-be-trained model, the second to-be-trained model and the to-be-trained instruction recognition model according to the predicted instruction categories and instruction category symbols corresponding to the sample speeches, determining the first to-be-trained model subjected to training as the speech vector model, determining the second to-be-trained model subjected to training as the text vector model, and determining the to-be-trained instruction recognition model subjected to training as the pre-trained instruction recognition model.

8. The speech instruction recognition method according to claim 7, wherein the step of training the first to-be-trained model, the second to-be-trained model and the to-be-trained instruction recognition model according to the predicted instruction categories and instruction category symbols corresponding to the sample speeches comprises:

calculating a loss function according to the predicted instruction categories and instruction categories corresponding to the sample speeches; and training the first to-be-trained model, the second to-be-trained model and the to-be-trained instruction recognition model with the aim of minimizing the loss function, wherein the loss function is a cross-entropy loss function.

9. The speech instruction recognition method according to claim 6, wherein the first to-be-trained model is a convolutional network model or a fully connected network model; and/or, the second to-be-trained model is a recurrent neural network model, a convolutional network model, or a BERT model; and/or, the to-be-trained instruction recognition model is a softmax logistic regression model.

10. An electronic device, comprising:

a processor; and a memory for storing an instruction to be executed by the processor;

wherein, the processor is configured to execute the instruction to implement the speech instruction recognition method according to claim 1.

11. A non-transitory computer readable storage medium, wherein when an instruction in the non-transitory computer readable storage medium is executed by a processor of an electronic device, the electronic device implements the speech instruction recognition method according to claim 1.

12. The electronic device according to claim 10, wherein the step of processing the target speech to obtain a target speech vector corresponding to the target speech comprises:

performing feature extraction on the target speech to obtain a target speech feature of the target speech; and inputting the target speech feature to a pre-trained speech vector model to obtain the target speech vector.

13. The electronic device according to claim 10, wherein the step of inputting the concat vector to the pre-trained instruction recognition model to obtain the instruction category corresponding to the target speech comprises:

calculating, by the pre-trained instruction recognition model, a probability of an instruction category i corresponding to the target speech;

$$y^i = \mathrm{softmax}(Wh_I + b),$$

wherein, $y^i$ represents the probability of the instruction category i corresponding to the target speech, i is an integer greater than or equal to 1 and less than or equal to n, n is the total number of instruction categories capable of being recognized by the instruction recognition model, W represents a mapping matrix of the instruction recognition model, $h_I$ represents the concat vector, and b represents a bias matrix of the instruction recognition model;

taking an instruction category with a maximum probability in n instruction categories as a target instruction category, wherein the target instruction category is the instruction category corresponding to the target speech.

14. The electronic device according to claim 12, wherein the target speech feature is a Mel Frequency Cepstral Coefficient feature.

15. The electronic device according to claim 12, wherein the step of processing the target speech text to obtain a target text vector corresponding to the target speech text comprises:

inputting the target speech text to a pre-trained text vector model to obtain the target text vector.

16. The electronic device according to claim 15, wherein before the step of inputting the target speech feature to a pre-trained speech vector model, the step of inputting the target speech text to a pre-trained text vector model and the step of inputting the target speech vector and the target text vector to the pre-trained instruction recognition model, the method further comprises:

performing joint training on a first to-be-trained model, a second to-be-trained model and the to-be-trained instruction recognition model to obtain the speech vector model, the text vector model and the pre-trained instruction recognition model.

17. The electronic device according to claim 16, wherein the step of performing joint training on a first to-be-trained model, a second to-be-trained model and the to-be-trained instruction recognition model to obtain the speech vector model, the text vector model and the pre-trained instruction recognition model comprises:

acquiring a training sample set, wherein the training sample set comprises multiple sample speeches and instruction category symbols corresponding to the sample speeches;

performing feature extraction on the sample speeches to obtain sample speech features of the sample speeches, and inputting the sample speech features to the first to-be-trained model to obtain sample speech vectors;

performing speech recognition on the sample speeches to obtain sample speech texts of the sample speeches, and inputting the sample speech texts to the second to-be-trained model to obtain sample text vectors;

inputting the sample speech vectors and the sample text vectors to the to-be-trained instruction recognition model to obtain predicted instruction categories corresponding to the sample speeches; and training the first to-be-trained model, the second to-be-trained model and the to-be-trained instruction recognition model according to the predicted instruction categories and instruction category symbols corresponding to the sample speeches, determining the first to-be-trained model subjected to training as the speech vector model, determining the second to-be-trained model subjected to training as the text vector model, and determining the to-be-trained instruction recognition model subjected to training as the pre-trained instruction recognition model.

18. The electronic device according to claim 17, wherein the step of training the first to-be-trained model, the second to-be-trained model and the to-be-trained instruction recognition model according to the predicted instruction categories and instruction category symbols corresponding to the sample speeches comprises:

calculating a loss function according to the predicted instruction categories and instruction categories corresponding to the sample speeches; and training the first to-be-trained model, the second to-be-trained model and the to-be-trained instruction recognition model with the aim of minimizing the loss function, wherein the loss function is a cross-entropy loss function.

* * * * *